Figure 5:
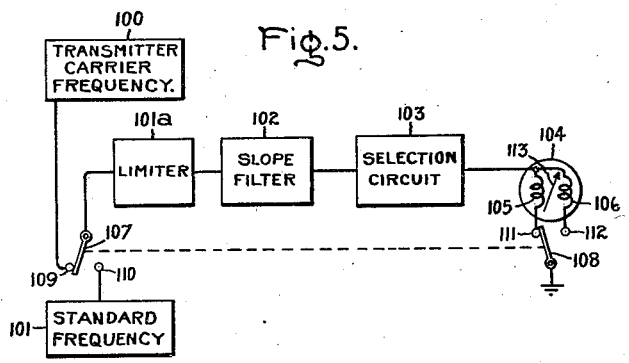

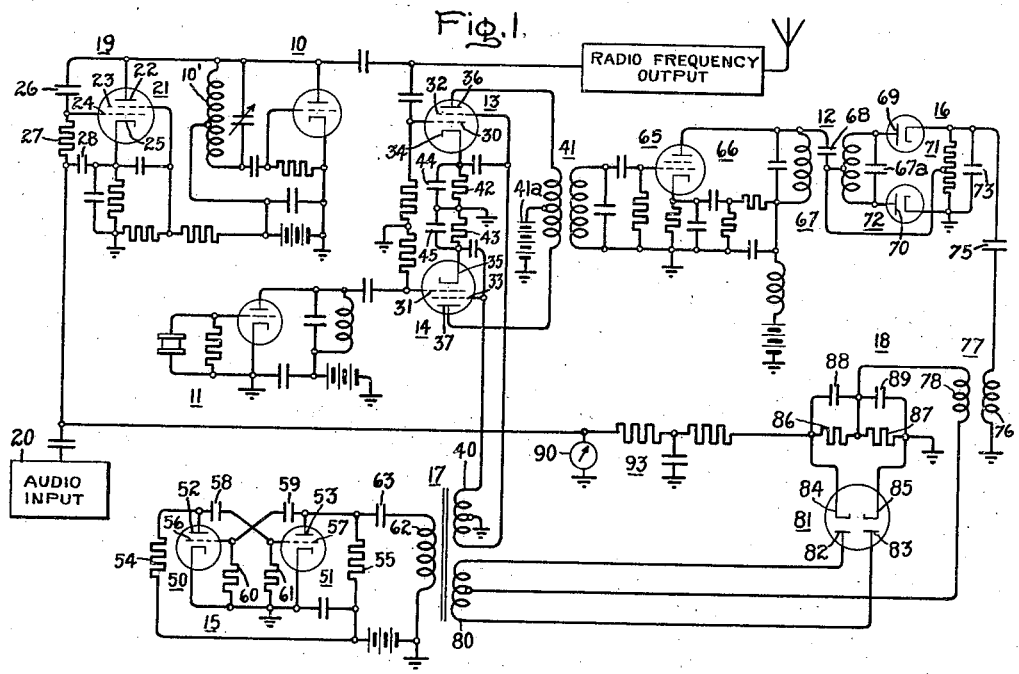

April 29, 1947.  E. H. B. BARTELINK  2,419,527
RADIO FREQUENCY TRANSMITTER MONITORING SYSTEM AND METHOD
Filed Feb. 27, 1943  3 Sheets-Sheet 2

Inventor:
Everhard. H. B. Bartelink,
by Harry E. Dunham
His Attorney.

April 29, 1947.    E. H. B. BARTELINK    2,419,527
RADIO FREQUENCY TRANSMITTER MONITORING SYSTEM AND METHOD
Filed Feb. 27, 1943    3 Sheets-Sheet 3
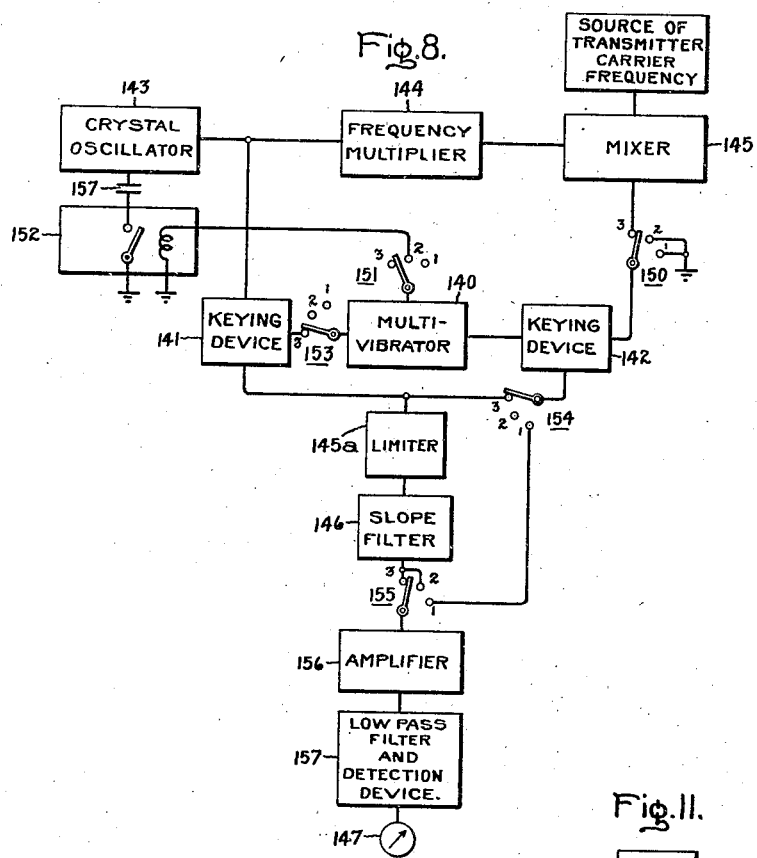
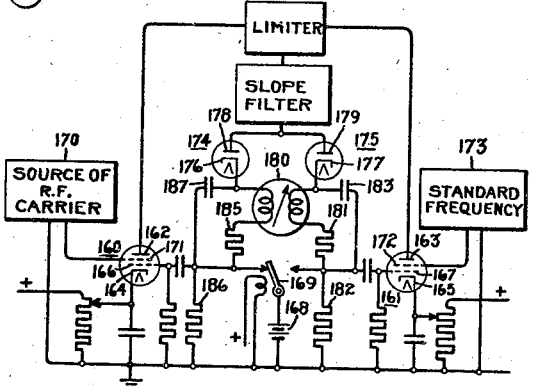
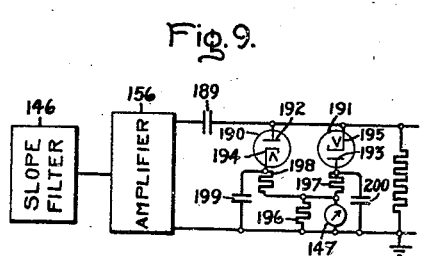
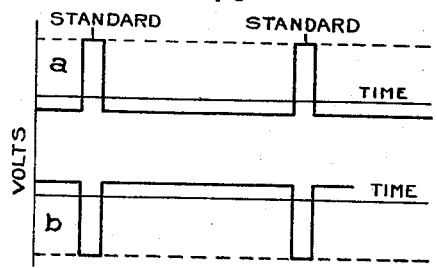
Inventor:
Everhard H.B. Bartelink,
by Harry E. Dunham
His Attorney.

Patented Apr. 29, 1947

2,419,527

UNITED STATES PATENT OFFICE 2,419,527

RADIO FREQUENCY TRANSMITTER MONITORING SYSTEM AND METHOD

Everhard H. B. Bartelink, West Milton, N. Y., assignor to General Electric Company, a corporation of New York Application February 27, 1943, Serial No. 477,399

21 Claims. (Cl. 250—17)

My invention relates to frequency responsive means and more particularly to monitoring and automatic frequency control means for frequency modulated radio transmitting systems.

It is, therefore, an object of my invention to provide new and improved means for monitoring frequency modulated transmitters.

Another object of my invention is to provide a new and improved automatic frequency control system for a frequency modulated communication system.

It is also an object of my invention to provide a new and improved system for stabilizing the frequency of an oscillator.

Still another object of my invention is to provide a new and improved system for stabilizing the frequency of an oscillator by comparison of that frequency with a standard frequency in a manner which does not depend upon tuned circuits.

Another object of my invention is to provide a new and improved frequency monitoring system or a new and improved automatic frequency control system in which the effect of undesired variations of inductance and capacity upon the operating or center frequency are eliminated.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which Fig. 1 is a schematic diagram of a specific embodiment of my invention; Figs. 2 and 3 are illustrative of certain operating conditions within the circuit shown in Fig. 1; Fig. 4 is a representation of a circuit characteristic of a portion of the circuit shown in Fig. 1; Figs. 5 to 9 and 11, inclusive, are illustrations of other embodiments and modifications of the invention shown in Fig. 1; and Fig. 10 is illustrative of operating conditions in the embodiment of my invention shown in Figs. 8 and 9.

My invention relates to a system for stabilizing the frequency of a frequency determining means such as an oscillator 10 or to a system for indicating frequency deviations of such means by comparing the frequency of the oscillator with the frequency of a source of standard frequency, as for instance a crystal oscillator 11, in a manner which is not dependent upon any tuned circuit for its accuracy. A frequency stabilizing circuit is illustrated in Fig. 1, in which the outputs of an oscillator 10 and that of an oscillator 11 of a standard frequency are applied periodically and alternately to a circuit 12, such as a slope filter or discriminator, which produces a direct current, the amplitude of which is dependent upon the frequency measured by means of a pair of keying tubes 13 and 14, the switching being controlled by a suitable source of keying voltage, as for example, a multivibrator 15. The circuit 12 is preferably of a type in which the voltage output is a linear function of frequency over the range within which control is to be established. A typical response curve for such a device is shown in Fig. 4 in which the abscissa represents the frequency of the input voltage and in which the ordinates represent the output voltage from the circuit.

If the oscillator and standard frequencies are identical, the output from the detector portion 16 of the slope filter 12 is steady direct current. If the oscillator frequency departs from the standard frequency, there results a pulsating output from the detector having a frequency the same as the keying rate, and a peak-to-peak magnitude proportional to the frequency deviation. This pulsating current is then combined with a voltage in phase with the keying voltage, as from a winding of the keying transformer 17, in a detection circuit 18 in order to obtain a direct current voltage the magnitude of which is proportional to the frequency difference and which can be applied to a utilization circuit, such as the transmitter frequency modulator 19 which is connected across the oscillator 10. This applied voltage constitutes a correction force tending to prevent any variation of frequency of the oscillator from the frequency standard and to restore the frequency to the standard frequency if such variation does occur.

If it is desired to monitor a frequency modulated transmitter at a point relatively remote from the transmitter or if it is not necessary actually to correct the frequency, the direct current voltage may be used to operate an indicating device instead of being fed back to the transmitter frequency modulator.

Describing the invention illustrated in Fig. 1 in greater detail, there is illustrated a frequency modulated transmitter employing a reactance modulator 19 for modulating the frequency of a master oscillator 10 according to the audio input from a suitable source as indicated by the numeral 20. The modulator may comprise an electron discharge device 21 of the screen grid type having an anode 22, a screen electrode or grid 23, a control electrode or grid 24, and a cathode 25, and a phase splitting circuit including a capacitor 26 connected between the control electrode and anode of the discharge device and a resistance 27 connected between the control electrode and cathode through a condenser 28 of such capacity as readily to pass radio frequency currents. The voltage across the capacitor lags the current by 90°. The radio frequency current in the anode circuit is in phase with the potential on the control electrode and, therefore, is 90° behind the current through the capacitor 26 and 90° behind the anode voltage. This lagging current has the effect of a variable reactance connected across the oscillatory circuit 10' of oscillator 10 and therefore the frequency varies in proportion to the anode current of the modulator. Since this variation depends upon the voltage applied to the control electrode 24, the oscillator frequency varies with the amplitude of the audio signal.

The radio frequency output from the oscillator is impressed on a suitable antenna in any desired manner. Inasmuch as this portion of the apparatus forms no part of my present invention, no specific means has been illustrated.

As previously stated, the oscillator output frequency is compared to the output frequency of the source of oscillations 11 of standard frequency. In making this comparison, the output from the oscillator 10 is impressed on the control electrode 30 of the electron discharge keying device 13 and the output of the frequency standard 11 is impressed on the control electrode 31 of the electron discharge keying device 14.

The keying tubes or discharge devices 13 and 14 are preferably of the screen grid type and, therefore, have screen grids or electrodes 32 and 33, respectively. Each of the tubes is also provided with cathodes 34, 35 and anodes 36, 37, respectively. The screen grids or electrodes are connected to the opposite ends of the center tapped secondary winding 40 of the transformer 17. The center tap of the secondary winding is preferably connected to ground, although if desired it may be connected to a source of positive potential. The anodes 36 and 37 are connected to opposite ends of the primary winding of a transformer 41. The cathodes of the keying tubes are connected together for direct current through resistances 42 and 43 and for alternating current by means of capacitors 44 and 45. The connections between the resistors and the capacitors are grounded.

In order to key the devices 13 and 14 periodically alternately there is provided a suitable source of keying voltage. In the specific form of my invention illustrated herein this timing means takes the form of a multivibrator 15 comprising a pair of electron discharge devices 50 and 51 having anodes 52 and 53, respectively, connected to the positive terminal of a suitable voltage source through anode resistors 54 and 55, respectively. The control electrodes 56 and 57, respectively, of the devices 50 and 51 are connected through condensers 58 and 59, respectively, to the anodes 53 and 52, respectively, grid leaks 60 and 61 being connected between the control electrodes 56 and 57, respectively, and ground.

In operating to produce spaced pulses of keying voltage, the voltages impressed on the control electrodes of the multivibrator become periodically of such values that the anode currents in the two devices are interrupted alternately. The charge which is accumulated on a given one of the two condensers 58 and 59 at a given period in the cycle of operation and which is sufficiently great to block the current flow in one discharge device when the other becomes conducting, then leaks off at an exponential rate until the anode current begins again to flow in the one device, or until the cutoff of the control electrode voltage-anode current curve of that one device is reached. That discharge device then becomes conductive again, and because of the charge which has accumulated on the opposite one of condensers 58 and 59 the grid of the opposite device is driven negative and that device becomes non-conductive, this cycle of operations repeating indefinitely.

The time constants of the multivibrator are chosen for a repetition rate higher or lower than the modulation frequency because if an attempt is made to correct the frequency at a repetition rate which is near audio frequencies, modulation is interfered with and even prevented since the correction circuit tends to prevent modulation swings. The repetition rate is preferably lower than the audio frequency because, from a practical standpoint, it is only necessary to correct for relatively slow changes or drifts of frequency. The multivibrator is preferably arranged in such a manner that discharge devices 50 and 51 are conductive during equal periods of time.

As a result of the above described operation, alternately positive and negative pulses are impressed upon the primary winding 62 of the transformer 17 through a coupling condenser 63. The alternations induce a voltage in the secondary winding 40 and accordingly, the screen grid potentials vary according to the instantaneous potentials at the ends of the windings 40. With this arrangement, the discharge devices 13 and 14 are normally inoperative because the voltages impressed on the control electrodes are insufficient to cause current flow between anode and cathode. However, when sufficient screen grid potential is applied through action of the multivibrator, the conduction through the keying tubes is controlled by the control electrode potentials.

In order to provide an anode potential for the keying tubes there is connected to the center tap of the primary winding of the transformer 41 a source of positive potential 41a. When the screen potential of one of the keying tubes rises sufficiently to cause discharge of the device, there occurs a flow of current through the upper or the lower portion of the transformer primary depending upon which of the keying tubes is conducting. The alternations of current through the primary winding induce a current flow in the secondary winding of the transformer 41 which is connected in the control electrode to cathode circuit of a limiting amplifier 65 which may comprise an electron discharge device 66 of suitable type, biased to be driven to saturation and hence to limit the anode voltage to a relatively constant peak value.

In order to transpose frequency variations of the oscillator 10 into voltage, there is provided a slope or discriminating circuit 12 comprising a transformer 67 having a primary and a secondary tuned to a suitable frequency by means of a suitable condenser 67a. The primary is connected across the anode-cathode circuit of the limiter 65 and the upper end of the primary is also connected to the midpoint of the secondary winding through a capacitor 68. The opposite ends of the secondary winding are connected to the anodes 69 and 70 respectively of diodes 71 and 72 which constitute the detector portion 16 of the slope circuit. The cathodes of the diodes are connected together for alternating current through a suitable capacitor 73 and for direct current through a suitable resistor 74. One of the cathodes is grounded. The other cathode is connected through a capacitor 75 to one side of the primary winding 76 of the transformer 77. The other side of the primary winding 76 is grounded.

The voltage across the secondary of the transformer 67 is displaced in phase from that across the primary winding by 90°. The primary voltage is in series with half the voltage in the secondary winding through the diode 71 and in series with the other half of the winding through the other diode 72. Because of the quadrature relationship between the primary and secondary voltages, the voltage on half of the secondary leads the primary voltage by 90° and that on the other half lags the primary voltage by 90°. The voltage across the cathodes is the difference between the two diode voltages. These voltages are equal when the frequency of the impressed oscillations is equal to that to which the circuits are tuned, and unequal, when the frequency varies, the inequality being in a direction dependent upon the direction of the frequency variation, thereby producing a unidirectional potential of one polarity or the other between the cathodes of the two diodes. The condenser 73 also serves to filter out the audio voltages appearing in the output. At resonance, the voltages are equal and opposite so that the difference is zero if the discriminating or slope circuit is tuned to operate normally at zero voltage, or is a constant direct current voltage if the operating point is elsewhere on the discriminator curve (see Fig. 4).

Thus, when the frequency of the transmitter deviates from the center frequency there is a resulting voltage because the phase of the secondary voltage varies from the 90° relation with the primary voltage in a direction dependent upon whether the oscillator frequency is above or below the standard frequency. Referring to Fig. 4, if the transmitter frequency decreases an amount $\Delta f$ there results a voltage output, $\Delta E$, in the output of the slope circuit. Thus the output of the slope circuit indicates any deviation of frequency and the magnitude of such deviation. The inclusion of the limiter 66 insures that the output varies only with frequency and not the amplitude of the impressed oscillations.

If the discriminator is stable, so that the characteristic curve is always as shown by the solid line in Fig. 4 no trouble would be encountered by including the slope circuit as a part of the correction or monitoring circuit. However, because of variations due to temperature changes, etc., the constants of the slope circuit may vary. For example, the characteristic might be shifted to positions such as indicated by the dotted lines $a$ and $b$ in Fig. 4. In such a case the slope filter would produce a direct current output even if the transmitter were at exactly the correct frequency. If, however, the above described keying scheme is used, in which alternations of the transmitter and standard frequency are applied to the slope filter, if the voltage output of the slope circuit is constant direct current, indicative of correct oscillator frequency, there will be no voltage induced in the secondary 78 of the transformer 77. This condition is illustrated in Fig. 2, wherein the abscissae represent time and the ordinates represent voltage. At $a$ there are illustrated the rectified pulses of the standard frequency source output, for example, and at $b$ of the figure the rectified pulses of the master oscillator output are depicted. Inasmuch as the amplitude of both sets of pulses is the same, a constant direct current voltage results, as indicated at $c$ in Fig. 2.

If there is a frequency deviation, pulsations of direct current appear in the primary winding 76 of transformer 77 and since the pulsations follow fairly rapidly, the effect is that of an alternating current wave of substantially square or rectangularly shaped half cycles. Such a condition is illustrated in Fig. 3 in which the abscissae represent time and the ordinates represent amplitude of voltage. The voltage obtained from the slope filter when the output of the standard source keying tube is applied will be the same as before, as indicated at $a$ in Fig. 3. If the transmitter average or center frequency has drifted to a higher frequency than that desired, the diode 71 will have a lower voltage impressed thereacross than across the diode 72 and, therefore, there will be a voltage pulse of lower amplitude than normal representing the transmitter frequency as indicated at $b$ in Fig. 3. Portion $c$ of Fig. 3 illustrates the resultant wave which may be considered to be an alternating current wave having a direct current component indicated by the dashed line.

It should be noted that Figs. 2 and 3 represent the outputs when the slope circuit or discriminator is operated over a band of frequencies which cause positive voltages in the output for all frequencies on the low frequency side of the average or center frequency. If operation is centered at the frequency providing zero voltage, the output voltage corresponding to the standard source is zero. If operation is had over frequencies on the high frequency end of the curve, both output voltages may be negative. In any case, however, with no deviation, a constant direct current voltage appears in the output and any deviation results in a pulsating direct current voltage.

Inasmuch as the voltage in the transformer 77 is a pulsating one, means must be provided in order to determine whether the alternating character of the voltage is caused by the master oscillator drifting to a higher or to a lower frequency than that desired.

To establish this determination there is provided a selection circuit or device 18 having connected thereacross a secondary winding 80 of the transformer 17, in such a way as to determine whether the positive portions of the voltage impressed on transformer 77 occur during the time when the oscillator output is impressed on the slope filter or during the interval when the standard frequency is being applied. The secondary winding 78 of the transformer 77 may be connected across a double diode discharge device 81 comprising anodes 82 and 83 and cathodes 84 and 85. Resistances 86 and 87 are connected in series across the cathodes and a pair of series connected capacitors 88 and 89 are connected in shunt across the resistors. One side of the secondary winding 78 is connected to the point of connection between the capacitors and also to the point of connection between the resistors. The other side of the winding is connected to the midpoint of the transformer winding 80 of the transformer 17. The ends of the winding 80 are connected to the anodes 82 and 83. The selection circuit is of a bridge type in which the resistors and capacitors form two legs, the upper and lower portions of the transformer winding 80 constituting the other two legs. The secondary winding 78 is connected across one pair of terminals. One of the cathodes is grounded and the other cathode is connected to the control electrode 24 of the modulator 19 through a suitable filter 93.

If it be assumed that the circuit 12 is arranged for operation as depicted in Figs. 2 and 3, i. e., on the low frequency side of zero volts output, meaning that the oscillator or transmitter frequency has drifted below the desired average frequency, voltage alternating in character is impressed on the primary winding 76 and since an increase in the voltage output of the slope circuit accompanies a decrease in frequency (see Fig. 4) the positive half cycles are produced when the keying tube 13 is conducting. The windings 76 and 78 are so arranged that if at any given instant the upper end of the primary winding 76 is at a positive potential, the upper end of the secondary winding is at a negative potential and the lower end at a positive potential. Now, in order to render the keying tube 13 conductive, its screen grid 32 must have a positive potential impressed thereon sufficiently great in amplitude to permit conduction. To meet this condition, the lower end of the secondary winding 40 of the transformer 17 must be at a positive potential. The windings 62, 40 and 80 are so arranged that under the above conditions the lower end of the winding 80 is also at a positive potential at that particular instant. Under such conditions the voltage of the winding 78 is in the same direction as the voltage of the lower half of the winding 80 and therefore the anode 83 is at a positive potential. At the same time, the voltage of the secondary winding 78 is in opposition to the voltage across the upper half of the winding 80 and therefore the potential at the anode 82 is lower than that at the anode 83. Therefore, the right-hand portion of the tube passes most of the current therethrough. The right-hand end of the resistor 87 is at a more positive potential and accordingly a negative potential is impressed on filter circuit 93. The filtered pulse is fed back to the control electrode 24 of the modulator 19. During the intervals when the frequency of the standard source is being measured, the keying tube 14 is conducting, as previously explained. Accordingly, the upper end of the winding 80 of the transformer 17 must be at a positive potential and the lower end of the winding 80 is at a negative potential. Since, under the assumed conditions, the voltage caused by operation of the keying tube 13 is higher than that caused by the operation of the keying tube 14, the upper end of the primary winding 76 will now be negative with respect to the lower or grounded end and therefore the lower end of the winding 78 will be at a negative potential. Now, with respect to the anode 82 there is impressed thereon the negative voltage due to the winding 78 and one-half the voltage of the winding 80 in the positive direction. By properly choosing the windings 80 and 77, the voltage of the winding 78 is greater than one-half of the voltage across the winding 80, and therefore, the anode 82 is at a negative potential. With respect to the anode 83 there is impressed thereon the negative voltage derived from the winding 78 in series with the negative voltage derived from the lower half of the winding 80 and therefore the anode 83 is also at a negative potential and neither portion of the double diode rectifier 81 passes current. Therefore, only negative pulses of correction voltage are conducted back to the modulator 19.

If now, it be assumed that the transmitter frequency has drifted to a higher value than before, the voltage output from the slope filter when the oscillator voltage is impressed thereon is lower than that caused by the operation of the crystal oscillator. Under this assumed condition, when the oscillator voltage is being measured, the lower end of the winding 78 is at a negative potential. At the same time in order that the keying tube 13 be conducting, the lower end of the winding 80 must be at a positive potential. Under these conditions the anode 82 has impressed thereon negative voltages due to the winding 78 and the upper half of the winding 80 in series. At the same time the anode 83 has impressed thereon the negative voltage derived from the winding 78 in opposition to the voltage across the lower half of the winding 80. Inasmuch as the voltage across the winding 78 is greater than that across the lower half of the winding 80 the anode 83 is also at a negative potential and no, or relatively little, rectification takes place. However, when the frequency of the standard source is being measured, the keying tube 14 is conducting so that the upper end of the winding 80 of the transformer 17 is at a positive potential and the lower end of the winding 78 is at a positive potential. In this case the anode 82 is at a positive potential and the anode 83 is at a lower potential so that the left-hand portion of the rectifier 81 conducts most of the rectified current, causing a positive pulse to be filtered and conducted to the control electrode 24 of the modulator 19.

Thus, the device 18 rectifies the slope circuit output. If the positive pulses or portions of that output are representative of a condition in which the oscillator frequency is too low, positive pulses will be fed back to the modulator in order to raise the bias on the control electrode. If, however, the positive pulses represent a condition in which the oscillator frequency is relatively high, there is provided a correction voltage in the opposite direction.

Thus, the modulating voltage impressed on electrode 24 comprises at least an audio voltage corresponding to the intelligence to be transmitted and, perhaps, a direct current correction voltage. In other words, the modulating voltage may comprise a direct current component, the amplitude and direction of which varies with the oscillator frequency deviation. As has been described heretofore, the variations in potential at the control electrode 24 cause variations in phase in the phase splitting circuit and thereby tune the oscillator to a different frequency in the direction of correction.

My invention may also be employed to monitor frequency modulated transmitters by giving an indication on suitable indicating means, as a meter 90, for example, connected across the filter output.

In Fig. 5 of the drawing there is shown another arrangement of such a monitor, adapted for use at the transmitting station. The component parts of the device are shown in block form. The transmitter carrier source 100 and the output of a standard frequency source, 101, such as a crystal oscillator, for example, are alternately applied to a limiting circuit 101a and a slope filter 102. The output is rectified in a suitable rectifier or selection circuit 103 and the rectified output is applied to a suitable indicating device 104. The device 104 is preferably a meter of the differential type having two coils 105 and 106. Suitable switching means is employed to apply the rectified voltage to coil 105 when the transmitter carrier frequency is being applied to the slope filter and then to the other coil 106 when the source of standard frequency is being applied to the slope filter. This function may be accomplished by employing a switch having movable conducting arms, 107 and 108, and two sets of contacts 109, 110 and 111, 112, respectively. The arms may be connected together mechanically so that the contacts are made and broken at substantially the same time. The switch may be operated at any suitable rate, as 1 to 10 times per second, for example, and the device may be in the form of a suitable relay. The resultant of the forces created by the currents flowing through the windings 105 and 106 determines the position of the indicating member 113 of the meter 104. If the transmitter carrier frequency and the standard frequency are the same, so that the rectified voltage output is steady direct current, the forces are equal and opposite and the member 113 will take a position at the center of the scale. The indicator will move to the right or the left of the center position an amount depending upon the direction of any difference in the rectified voltages.

Figure 6:
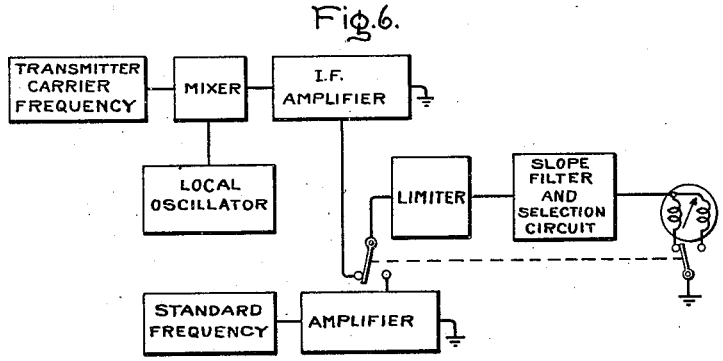

In Fig. 6 there is illustrated in block form a monitor which may be used at a receiving station. There is illustrated a superheterodyne type receiver and the intermediate frequency developed therein is compared to a standard frequency source in a slope filter and the rectified voltage output of a selection circuit is impressed on a meter in the manner illustrated in Fig. 5.

Figure 7:
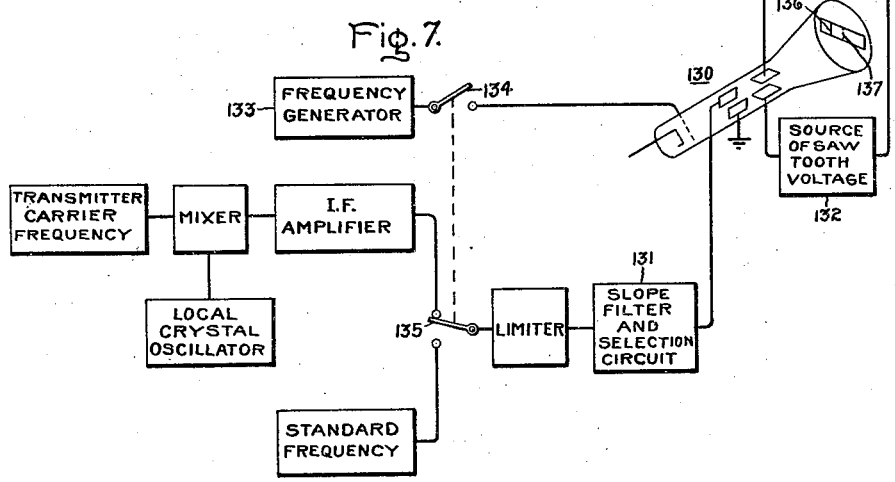

In Fig. 7 there is shown in block form an arrangement similar to that shown in Fig. 6 but in which a visual indicating means in the form of a cathode ray tube 130 is used. The output of a slope filter and selection circuit 131 may be impressed or placed across the horizontal deflection electrodes of the tube and a source of sawtooth voltage 132 connected across the vertical deflection electrodes. In order to distinguish between the frequency standard and the transmitter indications, there is provided means for injecting modulation in the cathode ray grid as by means of a frequency generator 133 controlled by a suitable relay 134 so arranged that when the intermediate frequency output is impressed on the cathode ray tube there is no modulation applied and a solid line as indicated by the numeral 136 is produced on the viewing screen but when the standard frequency source is being measured, the switch 134, which may be synchronized with switch 135 or connected directly thereto for movement therewith, is closed to inject the desired modulation and produces a dotted line as indicated by the numeral 137. The distance between the lines indicates the polarity and amount of deviation in frequency.

If desired, a string type oscillograph may be used and part of the light may be cut off when one frequency source, such as the transmitter carrier or oscillator output, frequency is being measured. With such an arrangement the oscillograph may produce one long and one short beam of light and the distance between the beams indicates the amount of deviation.

In Fig. 8 is shown a monitoring arrangement similar to that of Fig. 6 but which employs an unsymmetrical multi-vibrator 140 for keying the keying devices 141 and 142 which may be similar to those described in connection with the embodiment of my invention shown in Fig. 1. There is also illustrated the use of a crystal oscillator 143 for both the frequency standard and also the local oscillator for a superheterodyne type receiver. When the crystal oscillator acts as a local oscillator, the frequency may be multiplied in a suitable frequency multiplier 144 and introduced into the mixer 145. The keying device 142 then is utilized to apply the intermediate frequency to the limiter 145a and then the slope filter 146 at times determined by the operation of the multivibrator 140. The output of the slope filter is amplified in a suitable amplifier 156 and passed through a lowpass filter, if desired, and a detection device 157 to provide a suitable source of potential to operate the meter or indicating device 147.

In Fig. 9 is illustrated a suitable detection device for use in the system shown in Fig. 8. In this arrangement the output of the slope filter 146 is impressed upon a pair of reversely connected rectifiers 190 and 191 as by means of a coupling capacitor 189. The rectifiers comprise anodes 192 and 193, respectively, and cathodes 194 and 195, respectively. The anode 192 is connected to the cathode 195 and the cathode 194 is connected to the anode 193 through series connected resistors 197 and 198. One side of the output from the slope filter is connected to the anode 192 and the cathode 195 through the amplifier 156 and filters, if desired, and the other side of the slope filter output is connected to the connection between resistors 197 and 198 through a resistor 196. A capacitor 199 is shunted across the resistors 196 and 198 and a similar capacitor 200 is shunted across the resistors 196 and 197 for maintaining substantially constant the voltages on the meter. In order to provide an indication of the deviation there is provided a suitable indicating instrument 147 connected in shunt with the resistor 196. The meter or instrument 147 obviously indicates the resultant of the rectified voltages appearing across the condensers.

For accurate monitoring it is desirable to test the width of the multivibrator pulses. The necessity for such a test is better understood by a study of Fig. 10 in which the solid lines represent the voltages obtained from the slope filter plotted against time. For example, at $a$ in Fig. 10, the relatively high intensity, narrow, positive pulses may correspond to the pulses obtained when the standard source frequency is being measured and the relatively low intensity, relatively wide, negative pulses may be representative of the transmitter carrier frequency source. At $b$ in Fig. 10, there is indicated a condition in which the "standard" pulses are of negative polarity. These pulses are applied to the detection device. The dotted lines in Figs. 10a and 10b indicate the voltages appearing across the condensers 199 and 200. If the ratio between the width of the respective pulses is relatively great, as indicated in Fig. 10 the average voltage across one of the condensers from one source of pulses is much larger than that caused by the other source across the other condenser and the reading of the meter very nearly corresponds to the height of the positive pulse.

If it be assumed that the width of the transmitter pulses is the same as the width of the standard source pulses, the difference between the average values will be zero. If the transmitter pulse is too long with respect to the standard source pulse, the voltages from the transmitter source and the crystal source are more nearly equal and the difference is relatively small so that the meter will have a smaller deviation for the same degree deviation in frequency than if the transmitter pulse is much narrower than the standard frequency source pulse. On the other hand, if the transmitter pulse is too short the condensers associated with the detection device are not completely charged. Accordingly, for maximum variation of the meter, and therefore the greatest accuracy of the reading, it is desirable to have a pulse width for the transmitter pulses as small as possible consistent with complete charging of the capacitors. In other words, it is desirable to select a transmitter or carrier pulse width which is as short as possible consistent with obtaining the desired condenser charge. A standard frequency source pulse width of approximately 5 to 15% that of the frequency source pulse is suitable. With this method, zero frequency deviation always corresponds to zero meter indication.

Referring again to Fig. 8, it may be desirable to check the numerical calibration of the meter 147. For this purpose there may be provided a variable gain amplifier 156 and a plurality of switches, each having a movable arm adapted to engage one of three contacts. A switch of the multiple type having a plurality of movable arms carried on a single shaft may be used. The switch 150 is utilized to connect the keying device 142 to ground in positions 1 and 2 and to apply the mixer output to the keying device 142 in position 3. Switch 151 is arranged to be open in positions 1 and 3 and to connect the multivibrator to the relay 152 in position 2. Switch 153 is open in positions 1 and 2 and connects keying device 141 to the multivibrator 140 in position 3. Switch 154 is so arranged that it connects the keying device 142 to contact 1 of switch 155 in position 1, is open in position 2, and connects the keying device 142 to the limiter in position 3. Switch 155 connects the amplifier 156 through switch 154 to the keying device 142 in position 1, and connects the slope filter to the amplifier in positions 2 and 3.

With all switches in position 1 the apparatus is operative to test the width of the multivibrator pulses. Neither the transmitter frequency nor the standard frequency is applied to the indicator. The multivibrator is connected through the keying device 142 to the amplifier and detection device and the reading on the indicating device 147 is representative of the pulse width.

With all switches in position 2 the keying device 142 is still grounded so that the source of transmitter carrier frequency is not applied to the slope filter. The relay 152 is connected to the multivibrator and the output of the standard source of frequency is impressed upon the slope filter. In order to calibrate the instrument 147 and to adjust the amplifier to provide the desired amount of gain there is provided the relay 152 which is utilized to vary the frequency to which the oscillator 143 responds by introducing a capacity 157 into the oscillator circuit and thereby changing the operating frequency of the circuit a known amount at a rate dependent upon the multivibrator frequency. Inasmuch as the introduction of a known amount of detuning of the crystal oscillator will provide a known deviation, the amplifier may be adjusted until the indicator reading is that desired for that amount of deviation.

With the switches in position 3 the apparatus is set for monitoring the transmitter frequency. In this position the mixer is connected to the keying device 142, the multivibrator is connected to both keying devices, both keying devices are connected to the slope filter through a limiter 145a, and the slope filter output is amplified and then passed through a low pass filter and a selection device and then impressed upon the meter 147.

In Fig. 11 is illustrated another embodiment of my invention which enables visual indication when the carrier departs from the center frequency and which employs a different form of selection device. There are shown keying devices in the form of electron discharge devices 160 and 161 having anodes 162 and 163, respectively, cathodes 164 and 165, respectively, and a pair of control electrodes 166 and 167, respectively. The control electrodes are biased from a suitable source of potential such as a battery 168, the positive potential of which is alternately applied to the control electrodes by means of a relay 169 arranged to vibrate at a suitable rate, such as 1 to 10 cycles per second. The signals to be compared are impressed on a second set of control electrodes 171 and 172. The output of a suitable source of radio frequency carrier 170 is applied to the control electrode 171 of the discharge device 160 and the output of a suitable standard frequency device 173 is applied to the control electrode 172 of the device 161. Neither positive pulses from the battery 168 nor positive signals on control elements 171 or 172 can alone cause conduction. Conduction takes place only when both potentials on the control grid are positive and occur at the same time.

With the relay of Fig. 11 in the position shown, the positive battery potential is applied to the control electrode 166 and the device 160 conducts. The output is impressed on a limiter and then a suitable slope filter. During this interval there is no positive battery bias applied to the control electrode 167 and therefore the electron discharge device 161 does not conduct. When the relay 169 is in its right-hand position the discharge device 161 conducts and the discharge device 160 is non-conductive. Similarly, the output is impressed on the slope filter.

The output from the slope filter is impressed across rectifiers 174 and 175 comprising cathodes 176 and 177, respectively, and anodes 178 and 179, respectively. When the relay is in the left-hand position a positive bias is applied to the cathode 176 which renders the rectifier 174 inoperative. At the same time, however, the cathode 177 is connected to ground through the right-hand winding of the meter 180 and resistors 181 and 182. Therefore, on positive alternations of the slope filter output, current will be conducted by the rectifier 175. The voltage appearing across the right-hand coil of the meter 180 and the resistance 181 is utilized to charge a capacitor 183. When the relay 169 is in the right-hand position, the rectifier 174 is in operative condition and will conduct current on the negative alternations of the slope filter output. The current path includes the left-hand winding of the meter 180, the resistors 185 and 186. A capacitor 187 connected across the left-hand winding of the meter 180 and the resistor 185 is charged during the periods of conduction. The resistors 181 and 185 and the capacitors 183 and 187 are chosen to give a relatively long time constant to the circuits with which they are associated. Therefore, during the off periods of the associated rectifiers the voltage will be maintained substantially constant across the meter windings and the resultant of the forces on the meter is indicative of the frequency deviation. If the deviation is zero, the forces developed in the meter will be equal and opposite and the indicator will read at the center of the scale. If the source of standard frequency is higher than the transmitter, the voltage developed in the left-hand winding of the meter will be greater and the meter will read to the left of center. Similarly, when the source of radio frequency carrier has a higher frequency than the standard frequency, the meter will read to the right of center.

While I have shown and described a particular embodiment of my invention, it will be obvious to those skilled in the art that changes and modifications may be made without departing from my invention in its broader aspects. For example, the frequency output from the standard source may be a harmonic of the fundamental crystal frequency, and I, therefore, aim in the appended claims to cover all such changes and modifications as fall within the true spirit and scope of my invention.

What I claim as new and desire to secure by Letters Patent of the United States is:

1. In combination, a source of oscillations having a frequency subject to variation, a source of oscillations of standard frequency, means including frequency responsive means having a single output circuit for recurrently and alternately measuring the frequencies of said oscillations, and means utilizing the output of said frequency responsive means to determine the magnitude and direction of any deviation of the frequency of said variable source from the frequency of said standard source.

2. A frequency monitoring system comprising a source of oscillations having a frequency subject to variation, a source of oscillations of standard frequency, means including frequency responsive means for deriving from said sources a pulsating current having a peak to peak amplitude substantially proportional to any deviation of frequency of said variable source from said standard frequency, and means utilizing said pulsating current to determine the direction of said deviation.

3. A frequency monitoring system comprising a source of oscillations having a frequency subject to variation, a source of oscillations of standard frequency, frequency responsive means including a load circuit, periodic keying means associated with said frequency responsive means for alternately deriving in said load circuit unidirectional potentials proportional to the frequency of oscillations from said sources respectively, said unidirectional potentials being combined in said load circuit to provide an alternating voltage component having the frequency of said keying means and an amplitude dependent upon any deviation of said variable frequency from said standard frequency, and means utilizing said alternating voltage component to determine the magnitude and direction of said deviation.

4. In combination, a source of oscillations of variable frequency, a source of oscillations of standard frequency, a frequency discriminator having a load circuit, said frequency discriminator including means to produce in said load circuit a unidirectional current dependent in magnitude upon the frequency of oscillations supplied to said discriminator, means to supply oscillations from said sources to said discriminator alternately and recurrently whereby an alternating current appears in said load circuit in response to any deviation of said variable frequency from said standard frequency, and means to determine the direction of said deviation from said alternating current.

5. In combination, a source of oscillations of variable frequency, a source of oscillations of standard frequency, a frequency discriminator having a load circuit, said frequency discriminator including means to produce in said load circuit a unidirectional current dependent in magnitude upon the frequency of oscillations supplied to said discriminator, timing means to supply oscillations from said sources to said discriminator alternately and recurrently whereby an alternating current component appears in said load circuit in response to any deviation of said variable frequency from said standard frequency, the amplitude of said alternating current being a function of said deviation, and means coupled to said timing means for utilizing said alternating current component to determine the direction of said deviation.

6. In combination, a source of oscillations of variable frequency, a source of oscillations of standard frequency, a frequency discriminator having a load circuit, said frequency discriminator including means to produce in said load circuit a unidirectional current component dependent in magnitude upon the frequency of oscillations supplied to said discriminator, timing means to supply oscillations from said sources to said discriminator alternately and recurrently whereby an alternating current component appears in said load circuit in response to any deviation of said variable frequency from said standard frequency, the amplitude of said alternating current component being a function of the magnitude of said deviation, and rectifying means synchronously coupled with said timing means for utilizing said alternating current component to determine the direction of said deviation.

7. A frequency monitoring system comprising a source of oscillations of variable frequency, a source of oscillations of standard frequency, a frequency discriminator having a load circuit, said frequency discriminator including means to produce in said load circuit a unidirectional current dependent in magnitude upon the frequency of oscillations supplied to said discriminator, timing means to supply oscillations from said sources to said discriminator alternately and periodically whereby an alternating current component appears in said load circuit in response to any deviation of said variable frequency from said standard frequency, the amplitude of said alternating current component being a function of the magnitude of said deviation, and full wave rectifying means including a pair of output circuits disposed in differential relation to determine from said alternating current component the magnitude and direction of said deviation.

8. A frequency monitoring system comprising a source of oscillations of variable frequency, a source of oscillations of standard frequency, a frequency discriminator having a load circuit, said frequency discriminator including means to produce in said load circuit a unidirectional current dependent in magnitude upon the frequency of oscillations supplied to said discriminator, timing means to supply oscillations from said sources to said discriminator alternately and periodically whereby an alternating current component appears in said load circuit in response to any deviation of said variable frequency from said standard frequency, the amplitude of said alternating current component being a function of the magnitude of said deviation, and a pair of unilateral conducting paths for said alternating current component synchronously controlled by said timing means to determine the direction of said deviation.

9. In combination, a source of oscillations having a frequency subject to variation, a source of oscillations of substantially fixed standard frequency, frequency discriminating means including a load circuit, separate electric discharge devices arranged to connect each of said sources to said discriminating means, timing means for alternately and recurrently rendering said discharge devices conductive whereby an alternating current component appears in said load circuit in response to any deviation of said variable frequency from said standard frequency, the amplitude of said alternating current component being dependent upon the magnitude of said deviation, and rectifying means for determining from said alternating current component the direction of said deviation.

10. A frequency monitoring system comprising a source of oscillations having a frequency subject to variation, a source of oscillations of substantially fixed standard frequency, means responsive to any deviation of said variable frequency from said standard frequency to derive from said sources an alternating current having an amplitude dependent upon the magnitude of said deviation, means for deriving from said alternating current a unidirectional voltage having an amplitude dependent upon the magnitude of said deviation and a polarity indicative of the direction of said deviation, and means utilizing said unidirectional voltage for controlling said source of variable frequency to maintain said variable frequency substantially equal to said standard frequency.

11. A frequency monitoring system comprising a source of oscillations of variable frequency, a source of oscillations of standard frequency, said variable frequency source including an oscillator having a control electrode, a frequency discriminator having a load circuit, said frequency discriminator including means to produce in said load circuit a unidirectonal current component dependent in magnitude upon the frequency of oscillations supplied to said discriminator, means to supply oscillations from said sources to said discriminator alternately and recurrently whereby an alternating current component appears in said load circuit in response to any deviation of said variable frequency from said standard frequency, the amplitude of said alternating current component being dependent upon the magnitude of said deviation, and means including rectifying means for deriving from said alternating current component and applying to said control electrode a bias potential having an amplitude dependent upon the magnitude of said deviation and a polarity indicative of the direction of said deviation, thereby to maintain said variable frequency substantially equal to said standard frequency.

12. In combination, a source of electric oscillations including an oscillator having an output circuit and a control electrode, means for modulating the frequency of the oscillations in said output circuit in accordance with a desired signal about a mean frequency subject to variation, a source of substantially fixed standard frequency, frequency discriminating means having a load circuit, separate electric discharge devices arranged to connect said oscillator output circuit and said source of standard frequency with said discriminating means, a timing source of alternating potential having a frequency significantly lower than the frequency of said signal modulation and connected periodically and alternately to render said discharge devices conductive whereby a unidirectional potential having an alternating component equal in frequency to the frequency of said timing source and proportional in amplitude to any deviation of said mean frequency from said standard frequency appears in said load circuit, a pair of unilateral conducting devices differentially arranged to rectify the resultant of said alternating component and said timing voltage thereby to derive a unidirectional potential having a polarity indicative of the direction of said deviation and an amplitude proportional to the magnitude of said deviation, and means for supplying said unidirectional potential to said control electrode to maintain said mean frequency substantially constant.

13. A frequency monitoring system comprising a source of oscillations of variable frequency, a source of oscillations of standard frequency, frequency discriminating means including a load circuit, timing means to supply oscillations from said sources to said discriminating means periodically and alternately for unequal time intervals whereby an alternating current component appears in said load circuit in response to any deviation of said variable frequency from said standard frequency, said alternating current component having a frequency determined by said timing means and an amplitude dependent upon the magnitude of said deviation, and full wave rectifying means having a pair of output circuits connected in opposing relation to derive from said alternating current component a unidirectional potential having a polarity indicative of the direction of said deviation and an amplitude dependent upon the magnitude of said deviation.

14. A frequency monitoring system comprising a source of oscillations of variable frequency, a source of oscillations of standard frequency, a frequency discriminator having a load circuit, timing means to supply oscillations from said sources to said discriminator alternately and periodically for unequal time intervals whereby an alternating current component appears in said load circuit in response to any deviation of said variable frequency from said standard frequency, said alternating current component having a frequency determined by said timing means and an amplitude dependent upon the magnitude of said deviation, and unilateral conducting means for deriving from said alternating current component a unidirectional potential having a polarity indicative of the direction of said deviation.

15. A frequency monitoring system comprising a source of oscillations of variable frequency, a source of oscillations of standard frequency, a frequency discriminator having a load circuit, timing means to supply oscillations from said sources to said discriminator alternately and recurrently whereby an alternating current component appears in said load circuit in response to any deviation of said variable frequency from said standard frequency, said alternating current component having a frequency determined by said timing means and an amplitude dependent upon the magnitude of said deviation, a pair of unilateral conducting paths connected in like phase relation to said load circuit, and means associated with said timing means for alternately rendering said unilateral conducting paths conductive to determine the direction of said deviation.

16. A frequency monitoring system comprising a source of oscillations having a frequency subject to variation, a source of oscillations of substantially fixed standard frequency, frequency discriminating means including a load circuit, timing means to supply oscillations from said sources to said discriminator alternately and with a predetermined periodicity whereby an alternating current component appears in said load circuit in response to any deviation of said variable frequency from said standard frequency, said alternating current component having a frequency determined by said timing means and an amplitude dependent upon the magnitude of said deviation, directional indicating means including a pair of unilateral conducting paths connected to said load circuit in like phase relation, and means coupled to said timing means for rendering said unilateral conducting paths periodically and alternately conductive at the frequency determined by said timing means.

17. A frequency monitoring system comprising a source of oscillations having a frequency subject to variation, a source of oscillations of substantially fixed standard frequency, frequency discriminating means including a load circuit, timing means to supply oscillations from said sources to said discriminator alternately and periodically for unequal time intervals whereby an alternating current component appears in said load circuit in response to any deviation of said variable frequency from said standard frequency, said alternating current component having a frequency determined by said timing means and an amplitude dependent upon the magnitude of said deviation, means including indicating means connected to said load circuit for utilizing said alternating current component to indicate the direction of said deviation, and switching means for disconnecting said indicating means from said load circuit and connecting said indicating means directly to said timing means to indicate the relative lengths of said time intervals.

18. A frequency monitoring system comprising a source of oscillations having a frequency subject to variation, a source of oscillations of substantially fixed standard frequency, a frequency discriminator having a load circuit, timing means to supply oscillations from said sources to said discriminator alternately and periodically whereby an alternating current component appears in said load circuit in response to any deviation of said variable frequency from said standard frequency, said alternating current component having a frequency determined by said timing means and an amplitude dependent upon the magnitude of said deviation, means utilizing said alternating current component to indicate the magnitude and direction of said deviation, switching means for disconnecting said variable frequency source from and continuously connecting said standard frequency source to said frequency discriminator, and means associated with said switching means for varying said standard frequency between predetermined limits at a predetermined periodicity.

19. A frequency monitoring system comprising a source of oscillations having a frequency subject to variation, a source of oscillations of substantially fixed standard frequency, a frequency discriminator having a load circuit, timing means to supply oscillations from said sources to said discriminator alternately and periodically whereby an alternating current component appears in said load circuit in response to any deviation of said variable frequency from said standard frequency, said alternating current component having a frequency determined by said timing means and an amplitude dependent upon the magnitude of said deviation, means including indicating means for utilizing said alternating current component to indicate the magnitude and direction of said deviation, switching means for disconnecting said variable frequency source from and continuously connecting said standard frequency source to said frequency discriminator, and means associated with said switching means and said timing means for varying said standard frequency between predetermined limits at the frequency determined by said timing means to calibrate said indicating means.

20. The method of determining frequency deviation of electric oscillations from a source subject to variation in frequency with respect to oscillations from a source of substantially fixed standard frequency which comprises periodically and alternately deriving from said sources unidirectional potentials proportional in amplitude to the frequency measured, combining said unidirectional potentials to produce a pulsating unidirectional potential having an alternating component proportional in amplitude to the magnitude of any frequency deviation, and utilizing said alternating component to determine the direction of said deviation.

21. The method of determining frequency deviation of electric oscillations from a source subject to variation in frequency with respect to oscillations from a source of substantially fixed standard frequency which comprises periodically and alternately deriving from said sources unidirectional potentials proportional in amplitude to the frequency measured, combining said unidirectional potentials to produce a pulsating unidirectional potential having an alternating component proportional in amplitude to the magnitude of any frequency deviation, and combining said alternating component with an alternating voltage having a frequency corresponding to the periodicity of said alternative frequency measurement to determine the direction of said deviation.

EVERHARD H. B. BARTELINK.

REFERENCES CITED

The following references are of record in the file of this patent:

UNITED STATES PATENTS

| Number | Name | Date |
|---|---|---|
| 1,647,270 | Burton | Nov. 1, 1927 |
| 1,928,765 | Schaffer | Oct. 3, 1933 |
| 2,252,058 | Bond | Aug. 12, 1941 |
| 2,274,184 | Bach | Feb. 24, 1942 |